United States Patent
Wu et al.

(10) Patent No.: US 11,451,714 B2
(45) Date of Patent: Sep. 20, 2022

(54) LIGHT EMITTING ELEMENT DETECTING METHOD AND EQUIPMENT

(71) Applicant: MPI CORPORATION, Chu-Pei (TW)

(72) Inventors: Ping-Ying Wu, Chu-Pei (TW); Yung-Chin Liu, Chu-Pei (TW); Hsuan-Chiao Huang, Chu-Pei (TW)

(73) Assignee: MPI CORPORATION, Chu-Pei (TW)

(*) Notice: Subject to any disclaimer, the term of this patent is extended or adjusted under 35 U.S.C. 154(b) by 18 days.

(21) Appl. No.: 17/118,037

(22) Filed: Dec. 10, 2020

(65) Prior Publication Data
US 2021/0185211 A1  Jun. 17, 2021

Related U.S. Application Data

(60) Provisional application No. 62/948,186, filed on Dec. 13, 2019.

(30) Foreign Application Priority Data

Sep. 8, 2020 (TW) .................. 109130678

(51) Int. Cl.
*H04N 5/235* (2006.01)
*G06T 7/00* (2017.01)

(52) U.S. Cl.
CPC ......... *H04N 5/2352* (2013.01); *G06T 7/0004* (2013.01); *G06T 2207/30148* (2013.01)

(58) Field of Classification Search
CPC .... H04N 5/2352; H04N 5/238; G06T 7/0004; G06T 2207/30148; H01S 5/0042; H01S 5/183

USPC .......................................................... 348/92
See application file for complete search history.

(56) References Cited

U.S. PATENT DOCUMENTS

| | | | | |
|---|---|---|---|---|
| 2010/0238342 | A1* | 9/2010 | Ollila | H04N 5/23212 348/E5.045 |
| 2016/0269656 | A1* | 9/2016 | Tao | H04N 5/2357 |
| 2016/0366356 | A1* | 12/2016 | Shen | H04N 5/3532 |
| 2017/0322019 | A1* | 11/2017 | Takushima | G01S 17/08 |
| 2018/0174931 | A1* | 6/2018 | Henley | H01L 33/48 |
| 2020/0137301 | A1* | 4/2020 | Fields | H04N 5/3532 |
| 2020/0314411 | A1* | 10/2020 | Fields | H01L 33/48 |

FOREIGN PATENT DOCUMENTS

| | | |
|---|---|---|
| CN | 102928207 A | 2/2013 |
| CN | 106409197 A | 2/2017 |
| TW | 201025667 A | 7/2010 |

(Continued)

*Primary Examiner* — Marnie A Matt
(74) *Attorney, Agent, or Firm* — Birch, Stewart, Kolasch & Birch, LLP

(57) ABSTRACT

A light emitting element detecting method includes the steps of generating a first control signal to open a shutter of an image capturing device which captures an image toward a light outlet of a light emitting element, generating a pulse signal to light up the light emitting element, generating a second control signal to close the shutter of the image capturing device and obtaining a detection image, and determining the light emitting status of the light outlet of the light emitting element according to the detection image. As a result, the present invention can accurately detect whether the light outlet of the light emitting element has the problem of emitting no light or flashing.

12 Claims, 6 Drawing Sheets

(56) References Cited

FOREIGN PATENT DOCUMENTS

| | | | |
|---|---|---|---|
| TW | 201702568 A | 1/2017 | |
| TW | 201841275 A | 11/2018 | |
| WO | WO-2021256705 A1 * | 12/2021 | .............. F21V 33/00 |

* cited by examiner

LIGHT EMITTING ELEMENT DETECTING METHOD AND EQUIPMENT

CROSS REFERENCE TO RELATED APPLICATIONS

This non-provisional application claims the benefit under 35 U.S.C. § 119(e) to U.S. Provisional Application No. 62/948,186, filed on Dec. 13, 2019, and under 35 U.S.C. § 119(a) to Patent Application No. 109130678, filed in Taiwan on Sep. 8, 2020, all of which are hereby expressly incorporated by reference into the present application.

BACKGROUND OF THE INVENTION

1. Field of the Invention

The present invention relates generally to test technology for light emitting elements, e.g. laser chips, and more particularly, to light emitting element detecting method and equipment for detecting whether light outlets of a light emitting element emit light or flash.

2. Description of the Related Art

The conventional detection for the laser chip is performed to a large number of chips connected with each other in a manufactured wafer in a way that a tester makes the chip emit light by using probes of a probe card or other probe devices (e.g. edge sensor) to probe the chip and at the same time receives the light emitted from the chip for measuring the optical properties of the chip. The laser chip, especially the vertical-cavity surface-emitting laser array chip (also referred to as 'VCSEL' chip hereinafter), emits light in a way that a plurality of light outlets, which are distributed on a surface of the chip and arranged irregularly, emit light at the same time.

However, when a VCSEL chip is powered to emit light, one or some light outlets thereof may not emit light, or may emit light but also flash, which means the light outlets are not in constant light status, sometimes emitting light but sometimes not. If the questionable light outlets in a VCSEL chip, which emit no light or flash, exceed a certain amount or proportion, the chip should be determined as a defective item. Therefore, how to accurately detect whether the light outlets of the light emitting element have the problem of emitting no light or flashing is important for the test of the VCSEL chip.

SUMMARY OF THE INVENTION

The present invention has been accomplished in view of the above-noted circumstances. It is an objective of the present invention to provide light emitting element detecting method and equipment, which can accurately detect whether light outlets of a light emitting element have the problem of emitting no light or flashing.

To attain the above objective, the present invention provides a light emitting element detecting method which includes the steps of:

a) generating a first control signal to open a shutter of an image capturing device, the image capturing device capturing an image toward at least one light outlet of a light emitting element;

b) generating a pulse signal to light up the light emitting element;

c) generating a second control signal to close the shutter of the image capturing device and obtaining a detection image; and d) determining a light emitting status of the light outlet of the light emitting element according to the detection image.

To attain the above objective, the present invention provides a light emitting element detecting equipment which includes an image capturing device for capturing an image toward at least one light outlet of a light emitting element, a probe module for being electrically connected with the light emitting element, and a control module electrically connected with the image capturing device and the probe module. The control module periodically transmits a first control signal to the image capturing device to open the shutter thereof and a second control signal to the image capturing device to close the shutter thereof. Besides, the control module periodically transmits a pulse signal to the probe module to light up the light emitting element in a way that the time of transmitting the pulse signal is between the time of transmitting the first control signal and the time of transmitting the second control signal.

As a result, the present invention ensures that the image capturing device captures the image of the lighted-up light emitting element, thereby determining the light emitting status of the light outlet of the light emitting element accurately. For example, if the detection image shows that a light outlet emits no light, the light intensity thereof is not within a predetermined standard light intensity range, or the difference between the light intensity of the light outlet and the predetermined standard light intensity is larger than a predetermined error range, the light outlet is recorded as a questionable light outlet. In the present invention, a plurality of detection images may be obtained by repeating the steps a), b) and c) a plurality of times, and the detection images are compared one by one. If a light outlet is shown with normal light emitting status in partial detection images but determined as a questionable light outlet in the other detection images, it can be determined that the light outlet has the flash problem.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
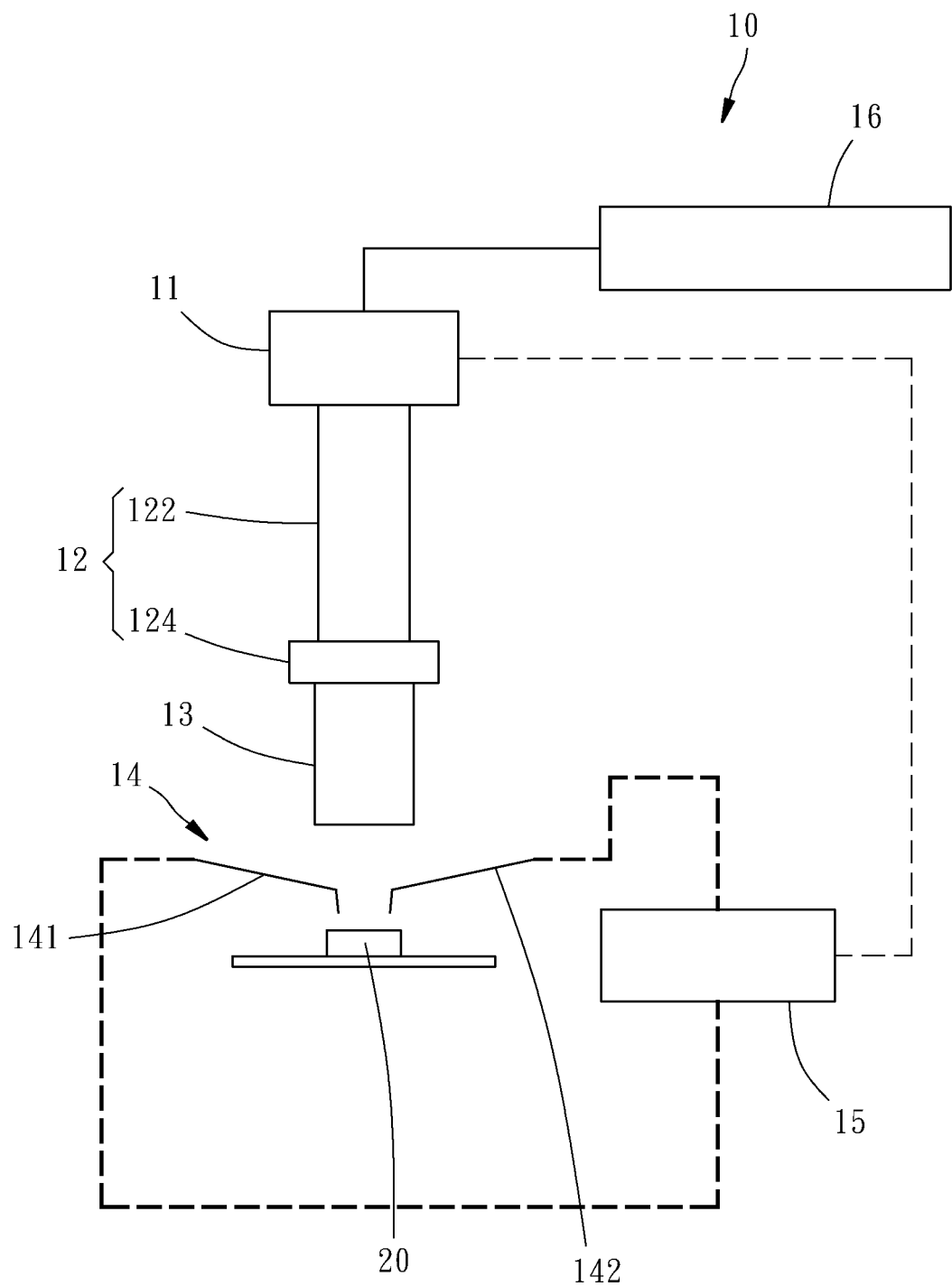
FIG. 1 is a schematic view of a light emitting element detecting equipment and a light emitting element according to a preferred embodiment of the present invention.
Figure 2:
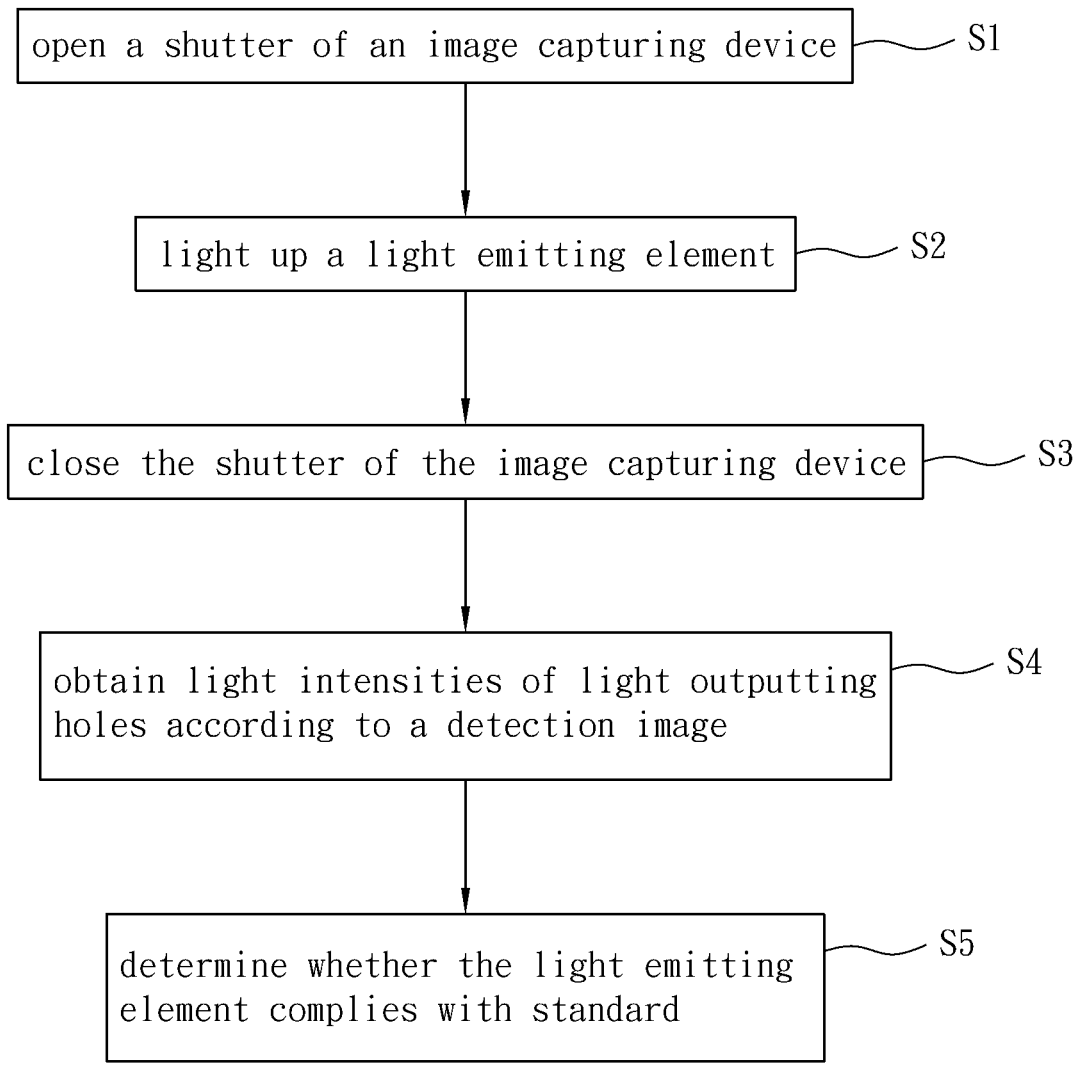
FIG. 2 is a flow diagram of a light emitting element detecting method according to the preferred embodiment of the present invention.
Figure 3:
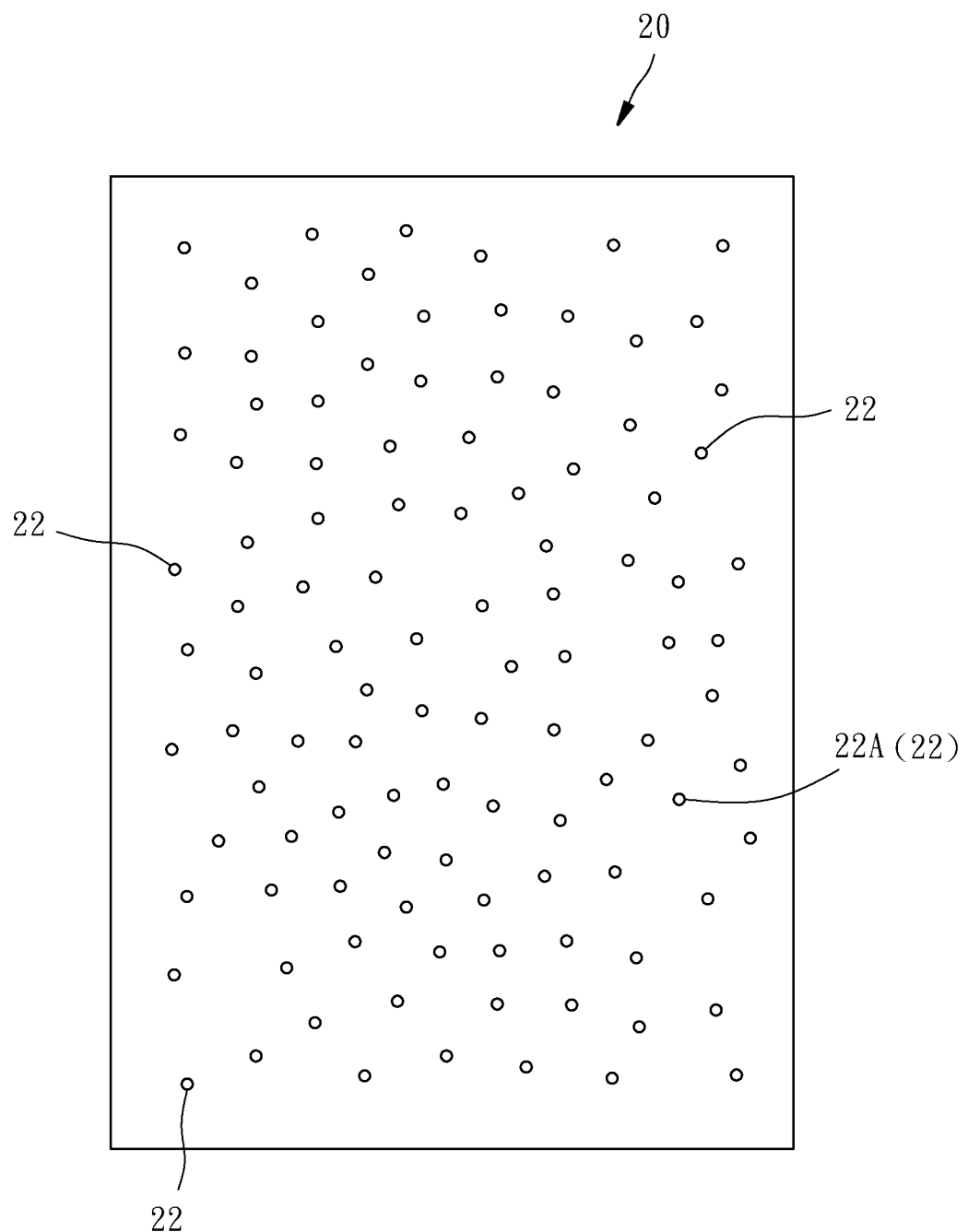
FIG. 3 is a schematic view of the light emitting element.

Referring to FIG. 1, a light emitting element detecting equipment 10 and a light emitting element detecting method as shown in FIG. 2 according to a preferred embodiment of the present invention are adapted to perform a light emitting detection to a light emitting element 20, especially for detecting such light emitting element as the VCSEL chip. In practice, the VCSEL chip is detected on a wafer before dicing. For the simplification of figures and the convenience of illustration, FIG. 1 schematically shows only one light emitting element 20 which represents a VCSEL chip. As shown in FIG. 3, the light emitting element 20 (VCSEL chip) has a plurality of light outlets 22.

As shown in FIG. 1, the light emitting element detecting equipment 10 includes an image capturing device 11, an optical adjustment module 12 coupled to the image capturing device 11, an objective lens 13 coupled to the optical adjustment module 12, a probe module 14, a control module 15 electrically connected with the image capturing device 11 and the probe module 14, and a storage device 16 electrically connected with the image capturing device 11.

The image capturing device 11 may be a photo camera or video camera, whose photosensitive element may be a charge-coupled device (also referred to as 'CCD') or a complementary metal-oxide-semiconductor (also referred to as 'CMOS'). The image capturing device 11 captures images toward the light outlets 22 of the light emitting element 20 through the optical adjustment module 12 and the objective lens 13.

In this embodiment, the optical adjustment module 12 includes an optical tunnel 122 (also referred to as 'OT') for guiding light, and a filtering unit 124 for filtering light. Two ends of the optical tunnel 122 are coupled to the image capturing device 11 and the filtering unit 124 respectively, and the filtering unit 124 is coupled to the objective lens 13. The filtering unit 124 may have a plurality of filters (not shown) with different filtering effects, and a rotary disc (not shown) for rotating the adapted filter to the detection light path when receiving a control signal. This part is relatively less related to the technical features of the present invention, thereby not being detailedly described hereinafter.

The probe module 14 includes a plurality of probes. In this embodiment, the probe module 14 is electrically connected with the light emitting element 20 by using a positive electrode probe 141 and a negative electrode probe 142 to probe positive and negative conductive contacts (not shown) of the light emitting element 20 respectively. Alternatively, the present invention is also adapted for the light emitting element provided on the front surface thereof with a conductive contact and provided on the back surface thereof with a plane electrode, and the probe module probes the conductive contact on the front surface of the light emitting element by a probe. The control module 15 may be a source measurement unit (also referred to as 'SMU') for precisely outputting the power demanded for the light emitting element 20 to emit light, and the power is transmitted to the light emitting element 20 through the probe module 14 to drive the light emitting element 20 to emit light.

Figure 4:
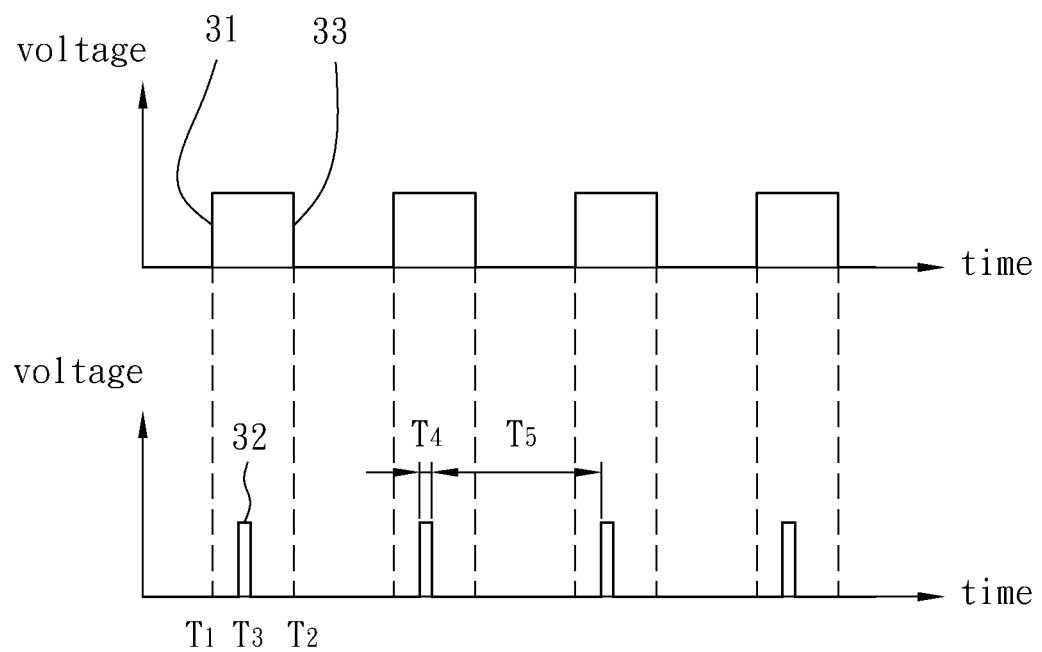
FIG. 4 is a schematic oscillogram of signals used in the preferred embodiment of the present invention.

Referring to the figures, the light emitting element detecting method of the present invention includes the following steps.

a) Generate a first control signal 31 as shown in FIG. 4 to open the shutter of the image capturing device 11, as the step S1 shown in FIG. 2.

b) Generate a pulse signal 32 as shown in FIG. 4 to light up the light emitting element 20, as the step S2 shown in FIG. 2.

c) Generate a second control signal 33 as shown in FIG. 4 to close the shutter of the image capturing device 11, and obtain a detection image 34, as the step S3 shown in FIG. 2.

d) Determine the light emitting status of the light outlets 22 of the light emitting element 20 based on the detection image 34, as the steps S4 and S5 shown in FIG. 2.

Figure 5:
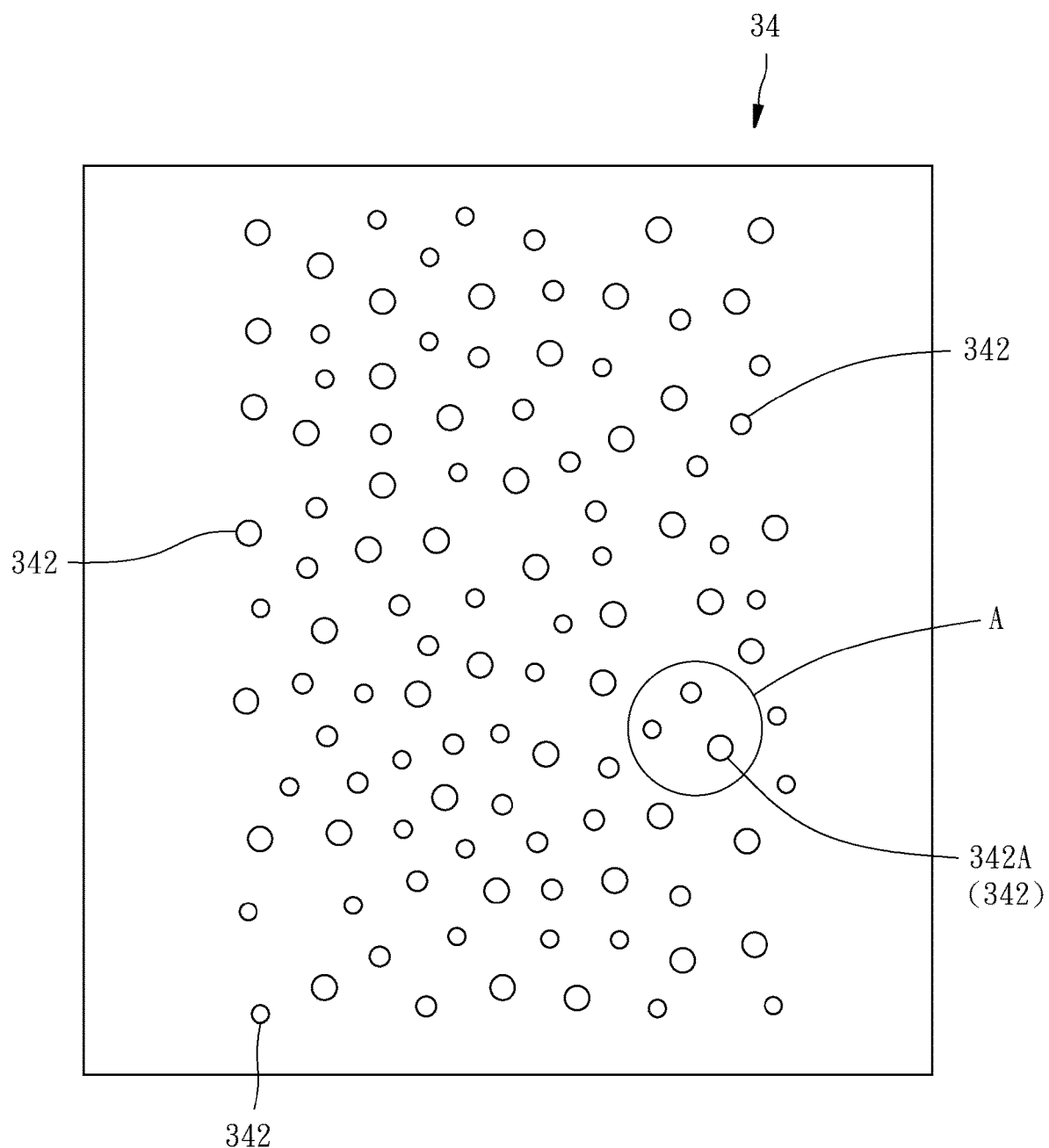
FIG. 5 is a schematic view of a detection image in the light emitting element detecting method according to the preferred embodiment of the present invention.

In this embodiment, the control module 15 periodically generates first and second control signals 31 and 33, which compose the square wave as shown in the upper part of FIG. 4, and the first and second control signals 31 and 33 are transmitted to the image capturing device 11. When the image capturing device 11 receives the first control signal 31 transmitted from the control module 15 at a first time T1, the shutter of the image capturing device 11 is opened and hence the photosensitive element starts to sense light. When the image capturing device 11 receives the second control signal 33 transmitted from the control module 15 at a second time T2, the shutter of the image capturing device 11 is closed and hence the photosensitive element no longer senses light. The light signal sensed by the photosensitive element is processed by the image capturing device 11, so that the detection image 34 corresponding to the photosensitive state is formed, as shown in FIG. 5, and then the detection image 34 is transmitted to the storage device 16 for storage.

Besides, the control module 15 also periodically generates pulse signals 32, which compose the square wave as shown in the lower part of FIG. 4, and the pulse signals 32 are transmitted to the probe module 14. The duration of every pulse signal 32 is very short, so it is represented by a time only, i.e. a third time T3. The pulse signal 32 is transmitted at the third time T3 between the first time T1, at which the first control signal 31 is transmitted, and the second time T2, at which the second control signal 33 is transmitted. When receiving the pulse signal 32, the light emitting element 20 is powered, so that the light outlets 22 thereof emit light. In other words, the time, at which the light emitting element 20 emits light, is arranged in the period, for which the shutter of the image capturing device 11 is open, that ensures the detection image 34 captured by the image capturing device 11 shows the light emitting statuses of the light outlets 22 of the light emitting element 20 for the determination in the following step d).

Specifically speaking, when the light emitting element 20 receives the pulse signal 32 and thus being powered, the light emitted from the light outlets 22 passes through the objective lens 13, the filter of the filtering unit 124 and the optical tunnel 122 and thus being received by the image capturing device 11. The light of the light outlets 22, which is indistinguishable to the naked eye, is presented on the detection image 34 by the image capturing device 11. As shown in FIG. 5, the detection image 34 shows a plurality of light spots 342 corresponding to the light outlets 22, respectively. The light spot mentioned in the present invention has usually an irregular shape in practice. However, for the simplification of the figures and the convenience of illustration, the light spots in the figures of the present invention are all drawn as circles.

Figure 6:
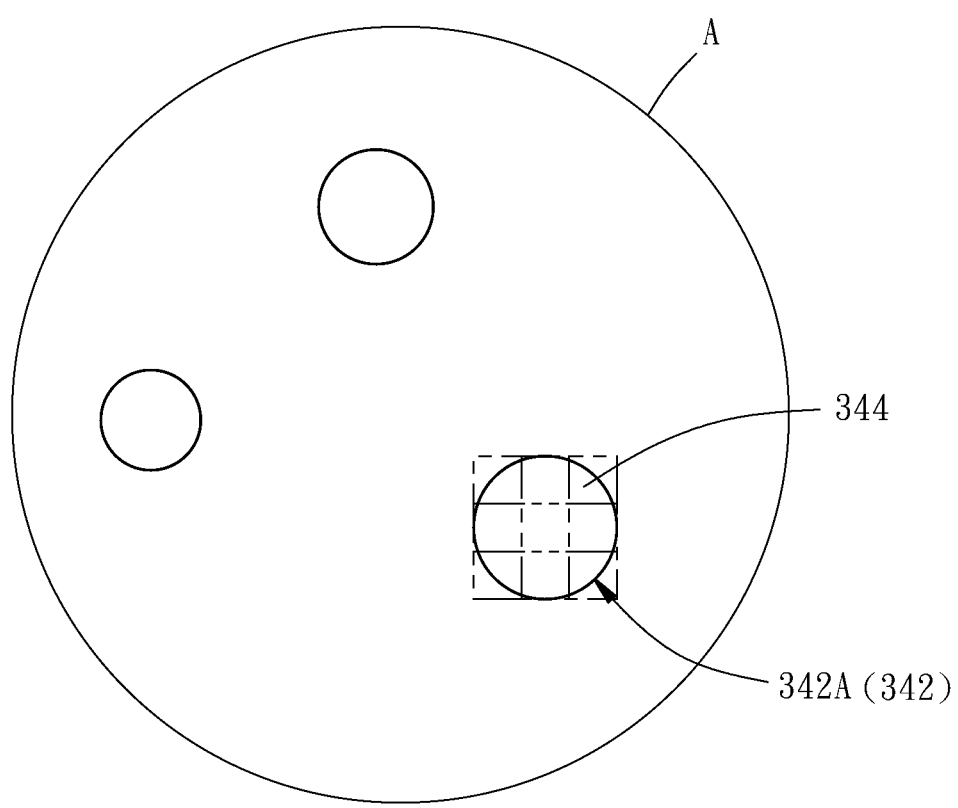
FIG. 6 is an enlarged view of the part A of FIG. 5.

In the step d), the way of determining the light emitting status may be firstly obtaining the light intensities of the light outlets 22 of the light emitting element 20 according to the detection image 34, and then determining the light emitting statuses of the light outlets 22 accordingly. Specifically speaking, an image processing software may be used to post process every pixel of the detection image 34 to obtain the relative light intensity of every pixel of the detection image 34, and then calculate the average of the relative light intensities of the pixels occupied by each light spot 342 to obtain the relative light intensity of each light spot 342, which can represent the light intensity of each light outlet 22. For example, the light spot 342A as shown in FIG. 6 occupies nine pixels 344 of the detection image 34. Calculating the average of the relative light intensities of the nine pixels 344 can obtain the relative light intensity of the light spot 342A. The light intensity of light outlet 22A as shown in FIG. 3 can be represented by the relative light intensity of the light spot 342A corresponding to the light outlet 22A. For the simplification of the figures, the figures of the present invention only schematically show nine pixels 344 of the detection image 34 by imaginary lines for the convenience of illustration.

It is to be mentioned that the relative light intensity mentioned in the present invention is a value calculated by the image processing software for representing the light intensity. The measured relative light intensity of the light spot 342 can be converted into the actual light intensity of the associated light outlet 22, for example, the unit of which is watt/steradian/square meter (W/Sr/cm$^2$), according to the comparison between the relative light intensity measured from the image of a standard light source and the physical quantity of the actual light intensity of the standard light source, for example, the unit of which is watt (W).

Further speaking, in the step d), it may be determined according to the light intensities obtained in the above-described process whether the light intensity of each light outlet 22 is within a predetermined standard light intensity range, or whether the difference between the light intensity of each light outlet 22 and a predetermined standard light intensity is larger than a predetermined error range. Under the condition that continuous detections for the light intensity of a specific light outlet 22 are performed, if the light intensity is not within the predetermined standard light intensity range or the difference between the measured light intensity and the standard light intensity is larger than the predetermined error range, this specific light outlet 22 is recorded as a questionable light outlet 22. If the amount of the light outlets 22 of the light emitting element 20, whose light intensities are out of the standard light intensity range, is larger than a reference quantity, or if the amount of the light outlets 22 of the light emitting element 20, the difference between each of which and the standard light intensity is larger than the predetermined error range, is larger than the reference quantity, i.e. if the amount of the questionable light outlets 22 is larger than the reference quantity, it is determined that the light emitting element 20 is substandard or classified under a certain useful grade.

For the light emitting element detecting method of the present invention, the aforementioned steps a), b) and c) may be repeated a plurality of times to obtain a plurality of detection images 34. The aforesaid detecting method can be achieved by the aforementioned control module 15 periodically transmitting the first and second control signals 31 and 33 and pulse signals 32. Besides, the light emitting statuses of the light outlets 22 of the light emitting element 20 in each of the detection images 34 can be determined by the above-described determination way. In this way, the detection accuracy is raised. In addition, by comparing the detection images 34 with each other, it can be determined whether each light outlet 22 flashes. Specifically speaking, if a light outlet 22 is shown with normal light emitting status in partial detection images 34 but has the problem of insufficient light intensity or no light in the other detection images 34, it can be determined that the light outlet 22 has the flash problem. In order to accurately detect whether the light outlet 22 has the problem of no light, insufficient light intensity or flash, it is preferable to repeat the aforementioned steps a), b) and c) at least ten times to obtain at least ten detection images 34 for comparison. Besides, as shown in FIG. 4, the light emitting element 20 emits light for a light emitting period T4 in every time of being lighted up by the pulse signal 32, and a cooling period T5 is provided between every two light emitting periods T4. The cooling period T5 is preferable to be at least a hundred times the light emitting period T4 (FIG. 4 is schematically drawn, not according to this ratio), so that the light emitting element 20, which is heated up because of emitting light, has enough time to cool down before the next time of emitting light, so as to avoid the influence of heat, thereby improving the accuracy of the detection.

In summary, in the present invention, the first and second control signals 31 and 33 are provided for controlling the shutter of the image capturing device 11 to open and close, and the pulse signal 32 is provided at the time between the times of providing the first and second control signals 31 and 33 for lighting up the light emitting element 20 under test. In this way, it is ensured that the image capturing device 11 captures the image of the lighted-up light emitting element 20 under test, thereby determining the light emitting statuses of the light outlets 22 of the light emitting element 20 accurately. As a result, the light outlet 22 having the problem of emitting no light, flashing, and so on, can be detected. Accordingly, it can be determined whether the light emitting element 20 complies with standard, or should be classified into a certain useful grade.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vertical-cavity surface-emitting laser (VCSEL) chip detecting method, comprising the steps of:
   a) generating a first control signal to open a shutter of an image capturing device, the image capturing device capturing an image toward at least one light outlet of a VCSEL chip;
   b) generating a pulse signal to light up the VCSEL chip;
   c) generating a second control signal to close the shutter of the image capturing device and obtaining a detection image; and
   d) determining a light emitting status of the light outlet of the VCSEL chip according to the detection image;
   wherein the steps a), b) and c) are repeated a plurality of times to obtain a plurality of said detection images, and in the step d), the light emitting status of the light outlet of the VCSEL chip is determined according to the detection images;
   wherein the step d) comprises a sub-step of comparing the detection images to determine whether the light outlet of the VCSEL chip flashes.

2. The VCSEL chip detecting method as claimed in claim 1, wherein said a plurality of times are at least ten times.

3. The VCSEL chip detecting method as claimed in claim 1, wherein the VCSEL chip emits light for a light emitting period in every time of being lighted up by the pulse signal; a cooling period is provided between every two said light emitting periods; the cooling period is at least a hundred times the light emitting period.

4. A light emitting element detecting method, comprising the steps of:
 a) generating a first control signal to open a shutter of an image capturing device, the image capturing device capturing an image toward at least one light outlet of a light emitting element;
 b) generating a pulse signal to light up the light emitting element;
 c) generating a second control signal to close the shutter of the image capturing device and obtaining a detection image; and
 d) determining a light emitting status of the light outlet of the light emitting element according to the detection image;
 wherein the step d) comprises a sub-step of obtaining a light intensity of the light outlet of the light emitting element according to the detection image.

5. The light emitting element detecting method as claimed in claim 4, wherein the step d) further comprises one of a sub-step of determining whether the light intensity of the light outlet of the light emitting element is within a standard light intensity range and another sub-step of determining whether a difference between the light intensity of the light outlet of the light emitting element and a standard light intensity is larger than a predetermined error range.

6. The light emitting element detecting method as claimed in claim 5, wherein the light emitting element comprises a plurality of said light outlets; if one of an amount of the light outlets of the light emitting element, whose light intensities are out of the standard light intensity range, and another amount of the light outlets of the light emitting element, the difference between each of which and the standard light intensity is larger than the predetermined error range, is larger than a reference quantity, it is determined that the light emitting element is substandard.

7. A vertical-cavity surface-emitting laser (VCSEL) chip detecting equipment configured to perform the VCSEL chip detecting method as claimed in claim 1, the VCSEL chip detecting equipment comprising:
 an image capturing device for capturing an image toward at least one light outlet of a VCSEL chip;
 a probe module for being electrically connected with the VCSEL chip; and
 a control module electrically connected with the image capturing device and the probe module, the control module periodically transmitting a first control signal to the image capturing device to open a shutter of the image capturing device and a second control signal to the image capturing device to close the shutter, and periodically transmitting a pulse signal to the probe module to light up the VCSEL chip in a way that a time of transmitting the pulse signal is between a time of transmitting the first control signal and a time of transmitting the second control signal.

8. The VCSEL chip detecting equipment as claimed in claim 7 further comprising:
 an optical adjustment module coupled to the image capturing device; and
 an objective lens coupled to the optical adjustment module;
 wherein the image capturing device captures the image toward the light outlet of the VCSEL chip through the optical adjustment module and the objective lens.

9. The VCSEL chip detecting equipment as claimed in claim 7 further comprising a storage device electrically connected with the image capturing device for storing the image captured by the image capturing device.

10. The VCSEL chip detecting method as claimed in claim 1, wherein the step d) comprises a sub-step of obtaining a light intensity of the light outlet of the VCSEL chip according to the detection image.

11. The VCSEL chip detecting method as claimed in claim 10, wherein the step d) further comprises one of a sub-step of determining whether the light intensity of the light outlet of the VCSEL chip is within a standard light intensity range and another sub-step of determining whether a difference between the light intensity of the light outlet of the VCSEL chip and a standard light intensity is larger than a predetermined error range.

12. The VCSEL chip detecting method as claimed in claim 11, wherein the VCSEL chip comprises a plurality of said light outlets; if one of an amount of the light outlets of the light emitting element, whose light intensities are out of the standard light intensity range, and another amount of the light outlets of the light emitting element, the difference between each of which and the standard light intensity is larger than the predetermined error range, is larger than a reference quantity, it is determined that the VCSEL chip is substandard.

* * * * *